United States Patent
Konigsberg et al.

(10) Patent No.: US 9,189,692 B2
(45) Date of Patent: Nov. 17, 2015

(54) METHODS AND SYSTEMS FOR DETECTING DRIVER ATTENTION TO OBJECTS

(71) Applicant: GM GLOBAL TECHNOLOGY OPERATIONS LLC, Detroit, MI (US)

(72) Inventors: Amir Konigsberg, Herzliya Pituach (IL); Eviatar Tron, Tel Aviv (IL); Gil Golan, Bnei Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 14/181,328

(22) Filed: Feb. 14, 2014

(65) Prior Publication Data

US 2015/0235096 A1 Aug. 20, 2015

(51) Int. Cl.
| | |
|---|---|
| *B60Q 1/00* | (2006.01) |
| *G06K 9/00* | (2006.01) |
| *B60Q 1/52* | (2006.01) |
| *B60R 16/023* | (2006.01) |
| *G08B 21/02* | (2006.01) |
| *G08G 1/0965* | (2006.01) |

(52) U.S. Cl.
CPC ............ *G06K 9/00845* (2013.01); *B60Q 1/525* (2013.01); *B60R 16/0236* (2013.01); *G08B 21/02* (2013.01); *G08G 1/0965* (2013.01)

(58) Field of Classification Search
CPC .. B60Q 1/525; B60R 16/0236; G08G 1/0965; A61B 3/113; H04N 9/045; G06K 9/00791
USPC ............ 340/439, 435, 436, 438, 902; 348/78, 348/222.1, 370; 382/103, 104, 16; 356/29
See application file for complete search history.

(56) References Cited

U.S. PATENT DOCUMENTS

| | | | |
|---|---|---|---|
| 5,668,675 A * | 9/1997 | Fredricks | 359/843 |
| 6,346,887 B1 | 2/2002 | Van Orden et al. | |
| 6,501,536 B1 * | 12/2002 | Fredricks | 356/3.01 |
| 8,022,831 B1 | 9/2011 | Wood-Eyre | |
| 9,047,256 B2 * | 6/2015 | Carlson et al. | 1/1 |
| 2002/0140562 A1 | 10/2002 | Gutta et al. | |
| 2003/0229441 A1 | 12/2003 | Pechatnikov et al. | |
| 2007/0159344 A1 | 7/2007 | Kisacanin | |
| 2007/0247524 A1 * | 10/2007 | Yoshinaga et al. | 348/78 |
| 2009/0016073 A1 | 1/2009 | Higgins-Luthman et al. | |
| 2009/0034801 A1 | 2/2009 | Hammoud | |
| 2009/0237644 A1 * | 9/2009 | Uechi | 356/29 |
| 2010/0114478 A1 | 5/2010 | Bai | |
| 2010/0138151 A1 | 6/2010 | Jang et al. | |
| 2011/0111724 A1 | 5/2011 | Baptiste | |

(Continued)

OTHER PUBLICATIONS

Konigsberg, A. U.S. Appl. No. 14/181,316, filed Feb. 14, 2014.

(Continued)

*Primary Examiner* — Hoi Lau

(74) *Attorney, Agent, or Firm* — Ingrassia Fisher & Lorenz, P.C.

(57) ABSTRACT

Methods and systems are provided for detecting an attention of an occupant of a vehicle. In one embodiment, a method includes calculating, by a processor, a first gaze vector in a three-dimensional space based on a first vehicle location, a first vehicle orientation, and a first gaze direction; calculating, by the processor, a second gaze vector in the three-dimensional space based on a second vehicle location, a second vehicle orientation, and a second gaze direction; and determining the attention of the occupant based on the first gaze vector and the second gaze vector.

20 Claims, 6 Drawing Sheets

(56) References Cited

U.S. PATENT DOCUMENTS

| | | |
|---|---|---|
| 2011/0121976 A1 | 5/2011 | Johns et al. |
| 2011/0210867 A1 | 9/2011 | Benedikt |
| 2012/0242819 A1 | 9/2012 | Schamp |
| 2013/0093603 A1* | 4/2013 | Tschirhart et al. ............ 340/902 |
| 2013/0162797 A1 | 6/2013 | Bogner |
| 2013/0222212 A1 | 8/2013 | Lorenz et al. |
| 2013/0307771 A1 | 11/2013 | Parker et al. |
| 2014/0139655 A1 | 5/2014 | Mimar |
| 2014/0204193 A1* | 7/2014 | Zhang et al. ..................... 348/78 |
| 2014/0210625 A1 | 7/2014 | Nemat-Nasser |
| 2014/0222277 A1 | 8/2014 | Tsimhoni et al. |
| 2014/0350942 A1* | 11/2014 | Kady et al. ..................... 704/275 |
| 2014/0375810 A1 | 12/2014 | Rodriguez |
| 2015/0009010 A1 | 1/2015 | Biemer |
| 2015/0035685 A1 | 2/2015 | Strickland et al. |
| 2015/0091740 A1 | 4/2015 | Bai et al. |
| 2015/0116493 A1 | 4/2015 | Bala et al. |
| 2015/0193664 A1 | 7/2015 | Marti et al. |
| 2015/0194035 A1 | 7/2015 | Akiva et al. |

OTHER PUBLICATIONS

USPTO, Office Action in U.S. Appl. No. 14/181,316 mailed Aug. 6, 2015.

* cited by examiner

METHODS AND SYSTEMS FOR DETECTING DRIVER ATTENTION TO OBJECTS

TECHNICAL FIELD

The technical field generally relates to methods and systems for detecting driver attention to point of interest, and more particularly to methods and systems for detecting driver attention to points of interest in a three-dimensional space.

BACKGROUND

Gaze detection systems generally include one or more cameras that are pointed at the eyes of an individual and that track the eye position and gaze direction of the individual. Vehicle systems use gaze detection systems to detect the gaze direction of a driver. The gaze direction of the driver is then used to detect the driver's attentiveness to the road ahead of them, or the driver's general attention to a feature inside the vehicle.

For example, some vehicle systems use the gaze direction of a driver to determine if the driver is inattentive to road and to generate warning signals to the driver. In another example, some vehicle systems determine that the driver is looking in the direction of a particular control knob or switch of the vehicle and can control that particular element (e.g., turn it on, etc.) based on the determination. In each of the examples, the vehicle systems make a general determination of where the driver is looking and do not make a determination of what the driver is looking at (i.e. what is grasping the attention of the driver).

Accordingly, it is desirable to provide methods and systems for detecting the attention of a driver to a point or object in a three-dimensional space. In addition, it is desirable to provide methods and systems for detecting the attention of a driver to a particular point or object outside of the vehicle. In addition, it is desirable to provide methods and system for making use of the information determined from the detected attention of the driver to the particular point or object. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for detecting an attention of an occupant of a vehicle. In one embodiment, a method includes calculating, by a processor, a first gaze vector in a three-dimensional space based on a first vehicle location, a first vehicle orientation, and a first gaze direction; calculating, by the processor, a second gaze vector in the three-dimensional space based on a second vehicle location, a second vehicle orientation, and a second gaze direction; and determining the attention of the occupant based on the first gaze vector and the second gaze vector.

In another embodiment, a system includes a first module that calculates a first gaze vector in a three-dimensional space based on a first vehicle location, a first vehicle orientation, and a first gaze direction, and that calculates a second gaze vector in the three-dimensional space based on a second vehicle location, a second vehicle orientation, and a second gaze direction. The system also includes a second module that determines the attention of the occupant based on the first gaze vector and the second gaze vector.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
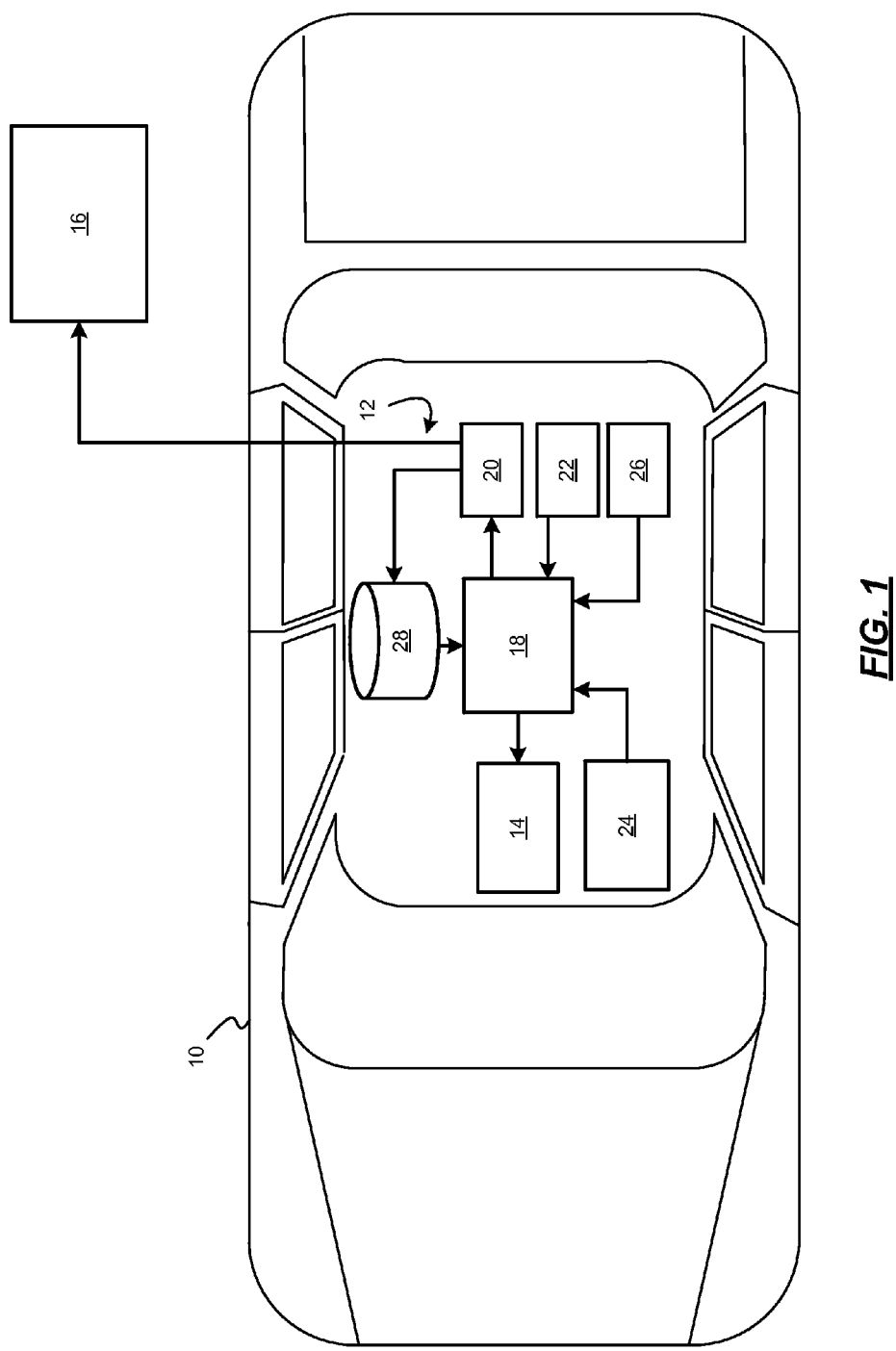
FIG. 1 is a functional block diagram of a vehicle that includes a driver attention detection system that communicates with an attention director system and/or a global attention processing system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 is a functional block diagram of a vehicle 10 that includes a driver attention detection system 12 that communicates with a driver attention director system 14 and/or a global (or comprehensive) attention processing system 16 in accordance with various embodiments. As can be appreciated, the vehicle 10 may be any vehicle, including but not limited to an automobile, an aircraft, a spacecraft, a watercraft, a sport utility vehicle, or any other type of vehicle 10. Although the figures shown herein depict an example with certain arrangements of elements, additional intervening elements, devices, features, or components may be present in actual embodiments. It should also be understood that FIG. 1 is merely illustrative and may not be drawn to scale.

As shown, the exemplary driver attention detection system 12 includes an attention determination module 18 that detects the attention of an occupant of the vehicle 10 (such as a driver and/or other occupants) to a point in a three-dimensional space. For exemplary purposes, the disclosure will be discussed in the context of detecting the attention of the driver.

As will be discussed in the exemplary embodiments below, the attention determination module 18 detects the attention of the driver to a point that is outside of the vehicle 10 (referred to as a point of interest) and, in some cases, associates the point with a particular object that is located at that point (referred to as an object of interest). For example, the object may be a fixed or mobile object such as, but not limited to, a road feature (e.g., an exit ramp, a traffic light, a road sign, a guard rail, another vehicle, a pedestrian, etc.), an advertisement feature (e.g., a billboard, a sign, a building, a sign on a moving vehicle, etc.), or a particular landmark (e.g., either a natural landmark, or a man-made landmark) that the driver is focusing on.

Once the point of interest and/or the object of interest have been detected, the attention determination module 18 stores information about the driver's attention to the point of interest and/or the object of interest for future use. For example, the attention determination module 18 stores the time the driver's attention was on the point of interest and/or the object of interest, the location of the point of interest, and any information describing the object of interest, if identified.

In various embodiments, based on the information about the driver's current attention, the attention determination module 18 determines whether or not to direct the driver's attention to a different point of interest and/or object of interest on the three-dimensional space. For example, if the determined attention of the driver indicates that the driver is looking away from a particular desired point of interest or object of interest, the attention determination module 18 can provide notification data to the driver attention director system 14. The driver attention director system 14, in turn, includes one or more director devices that selectively activate based on the notification data to direct the driver's attention. As can be appreciated, the director devices can include, but are not limited to, light devices, a display screen, audio devices, haptic devices, a phone (e.g., a personal phone that is paired with the vehicle 10 or a phone that is integrated with the vehicle 10), a heads up display, or any combination thereof.

In various embodiments, the attention determination module 18 communicates the information about the attention of the driver to the global attention processing system 16. The communication may be through, for example, a wireless communication system 20 (e.g., a Wi-Fi system, a cellular network system, a Bluetooth system, etc.) or other communication system (not shown) of the vehicle 10. The global attention processing system 16 processes the information from the vehicle 10 and/or from multiple vehicles (not shown) to determine global points of interest (i.e., points of interest viewed a number of times by a single driver, by a number of occupants, or by a number of vehicles), global objects of interest (i.e., objects of interest viewed a number of times by a single driver, by a number of occupants, or by a number of vehicles), and/or other statistics.

In various embodiments, the attention determination module 18 detects the attention of the driver to the points of interest and/or the objects of interest based on information received from one or more systems of the vehicle 10. For example, the attention determination module 18 receives inputs from a global positioning system 22, a gaze detection system 24, an inertial measurement system 26, and an object maps datastore 28. As can be appreciated, in various embodiments, the attention determination module 18 may receive inputs from other systems (not shown) in addition to or as an alternative to the systems shown and described.

The global positioning system 22 communicates with satellites (not shown) to derive a current location (e.g., latitude and longitude coordinates) of the vehicle 10. The global positioning system 22 provides the location information to the attention determination module 18. As can be appreciated, other systems of determining a location of the vehicle 10 may be used as an alternative. Such systems may include, but are not limited to an antenna signal triangulation system or other system.

The gaze detection system 24 includes one or more tracking devices (e.g., such as a camera or other device) that track the eye position, eye movement, head position and/or head movement of the driver (or other occupants), and an image processor that process the data from the tracking devices to determine a gaze direction of the driver (or other occupants). The gaze detection system 24 provides the gaze direction to the attention determination module 18. As can be appreciated, the gaze detection system 24 can provide the gaze direction of the driver, other occupants, and/or the driver and the other occupants. For exemplary purposes, the disclosure will be discussed in the context of the gaze detection system 24 providing the gaze direction of the driver.

The inertial measurement system 26 includes one or more measurement devices that determine an orientation of the vehicle 10. The inertial measurement system 26 provides the orientation (e.g., the bearing and elevation) of the vehicle 10 to the attention determination module 18. As can be appreciated, other systems of determining an orientation of the vehicle 10 may be used as an alternative. Such systems may include, but are not limited to a compass or other system.

The object maps datastore 28 stores location information and descriptive information (e.g., a name, or type of object) about objects in a three-dimensional space in a format, such as a map format. The map can be provided to the vehicle 10 through the wireless communication system 20. The map can be communicated to the vehicle 10 from a stationary system (e.g., from a central processing center) or a mobile system (e.g., from another vehicle). As can be appreciated, separate maps can be provided for certain types of objects, or a single map can be provided for any number of different types of objects. The maps can be selectively provided and/or stored to the object maps datastore 28 based on a location of the vehicle 10, or other criteria. The object maps datastore 28 provides the maps to the attention determination module 18.

Figure 2:
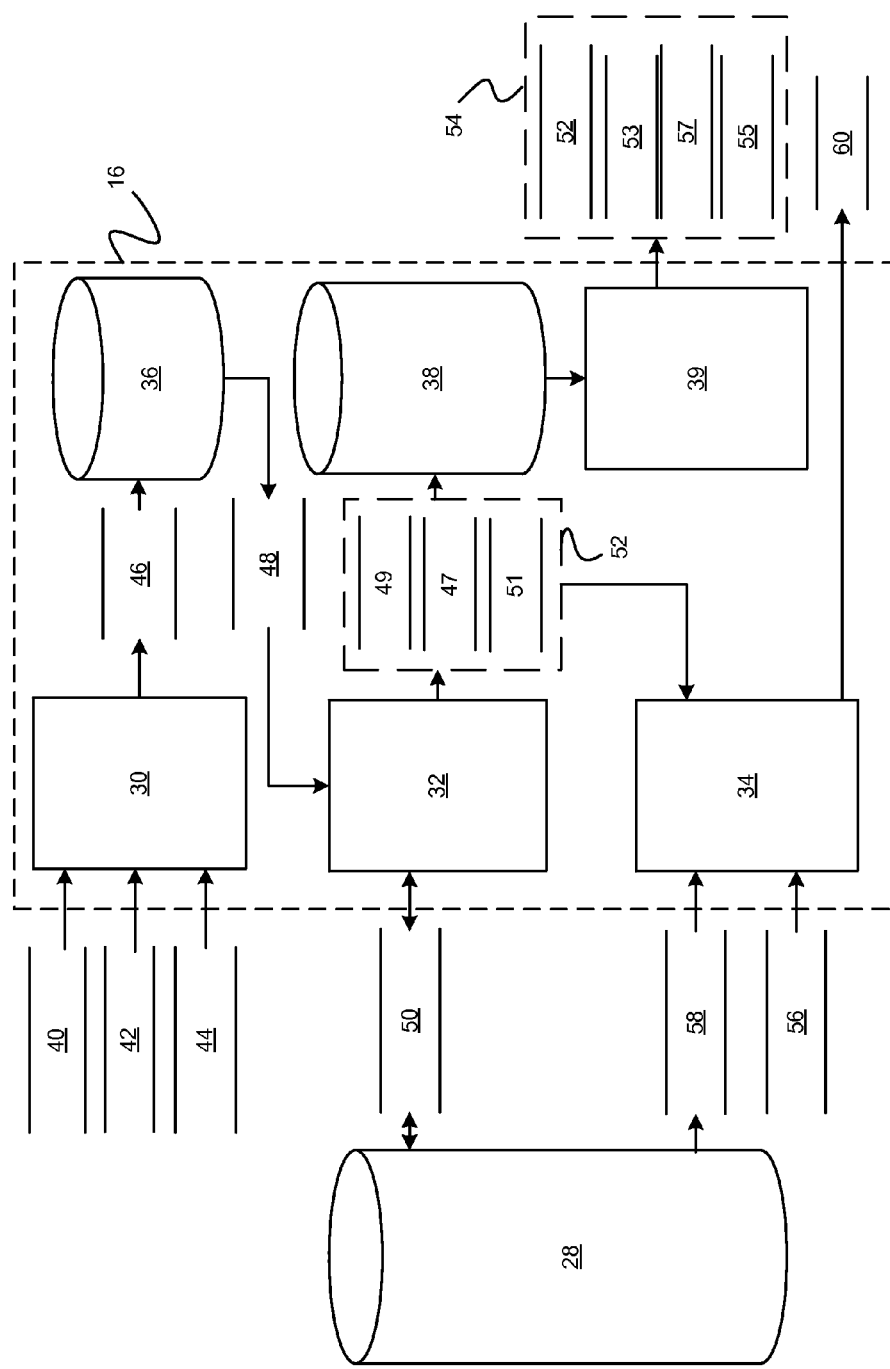
FIG. 2 is a functional block diagram illustrating functional modules of the driver attention detection system in accordance with various embodiments.

Referring now to FIG. 2 and with continued reference to FIG. 1, a functional block diagram illustrates various embodiments of the attention determination module 18. Various embodiments of an attention determination module 18 according to the present disclosure may include any number of sub-modules. As can be appreciated, the sub-modules shown in FIG. 2 may be combined and/or further partitioned to similarly detect the driver's attention to points and/or objects in a three-dimensional space. In various embodiments, as shown in FIG. 2, the attention determination module 18 includes a gaze vector calculation module 30, an attention determination module 32, an attention director module 34, a gaze vector datastore 36, an attention data datastore 38, and an attention data communication module 39.

The gaze vector calculation module 30 receives as input, vehicle location data 40 (e.g., from the GPS system 22), gaze direction data 42 (e.g., from the gaze detection system 24), and vehicle orientation data 44 (e.g., from the inertial measurement system 26). The received data 40-44 is associated with a particular time (t). For example, the vehicle location data 40 can indicate a location of the vehicle 10 in absolute coordinates (X, Y, Z) at a particular time (t). The vehicle orientation data 44 can indicate a pointing vector of the vehicle in absolute coordinates (X, Y, Z) at a particular time (t). The gaze direction data 42 can indicate a gaze direction of the driver relative to vehicle coordinates (x, y, z) at a particular time (t).

Figure 3:
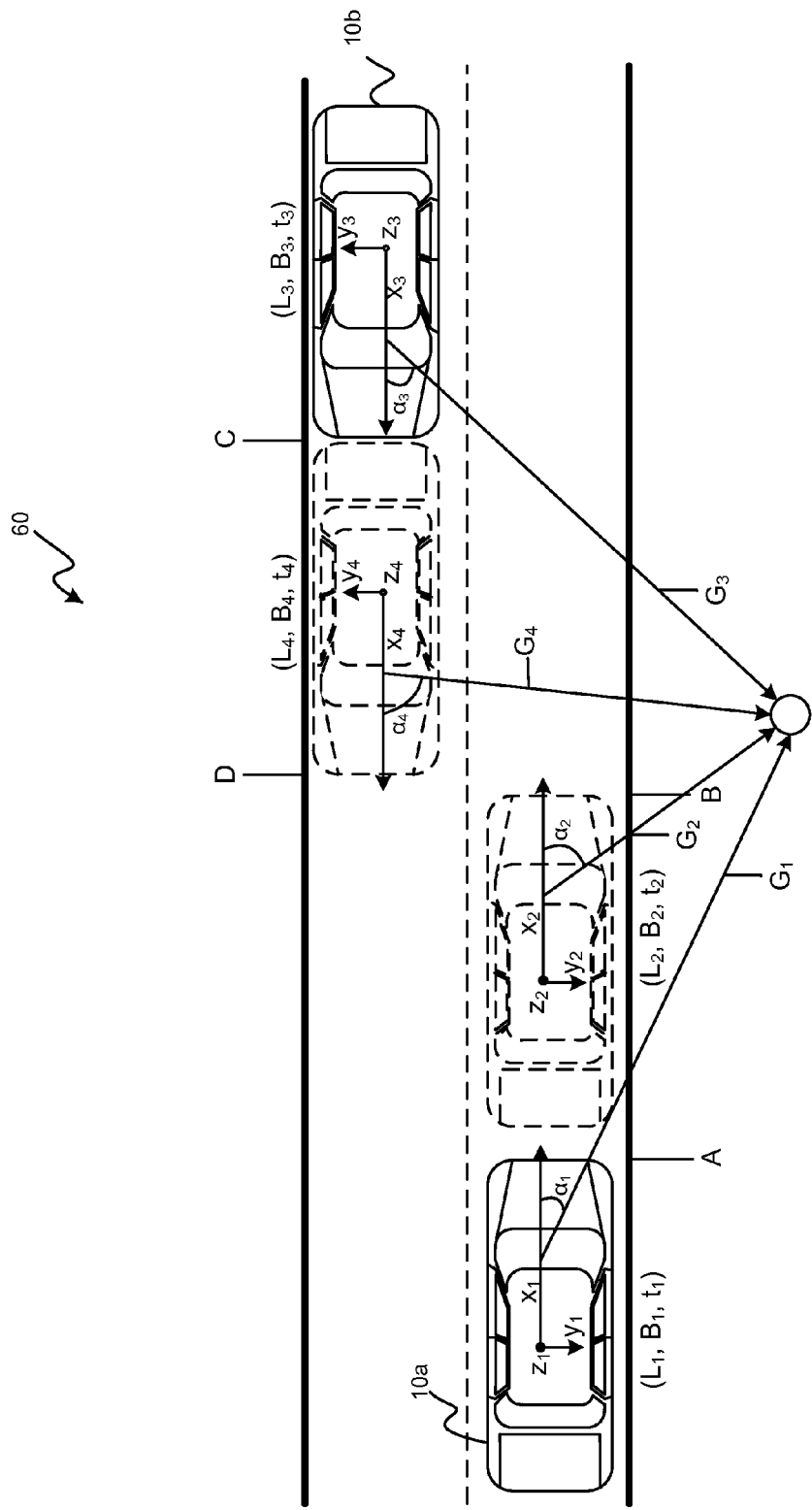
FIG. 3 is an illustration of gaze vectors that are used to determine driver attention by the driver attention detection system in accordance with various embodiments.

Based on the inputs 40-44, the gaze vector calculation module 30 determines a gaze vector 46 in absolute coordinates (X, Y, Z) of the driver for the particular time (t) and stores the gaze vector 46 in the gaze vector datastore 36 for future use. For example, as shown in FIG. 3, the location ($L_1$) of a first vehicle 10a can be provided in absolute coordinates at a first time $t_1$ corresponding to a first position A on a road. The orientation or bearing ($B_1$) of the first vehicle 10a can be provided in absolute coordinates and can include the azimuth angle and the elevation. The gaze direction of the driver can be provided in vehicle coordinates and can include the angle $\alpha_1$. The gaze vector ($G_1$) is determined in vehicle coordinates ($x_1$, $y_1$, $z_1$) based on the angle $\alpha_1$ and then converted into absolute coordinates based on the location and bearing ($L_1$, $B_1$, $t_1$) using a coordinate system transformation.

As the vehicle 10a moves forward from the first position A to a second position B on the road, the location ($L_2$) of the vehicle 10a is provided in absolute coordinates at a second time $t_2$. The orientation or bearing ($B_2$) of the first vehicle 10a can be provided in absolute coordinates and can include the azimuth angle and the elevation. The gaze direction of the driver can be provided in vehicle coordinates and can include the angle $\alpha_2$. A second gaze vector ($G_2$) is determined in vehicle coordinates ($x_2$, $y_2$, $z_2$) based on the angle $\alpha_2$ and then converted into absolute coordinates based on the location and bearing ($L_2$, $B_2$, $t_2$) using a coordinate system transformation.

Likewise, if a second vehicle 10b were traveling in the opposite direction in the opposite lane on the road, the location ($L_3$) of the second vehicle 10b can be provided in absolute coordinates at a first time $t_3$ corresponding to a first position C on the road. The orientation or bearing ($B_3$) of the second vehicle 10b can be provided in absolute coordinates and can include the azimuth angle and the elevation. The gaze direction of the driver can be provided in vehicle coordinates and can include the angle $\alpha_3$. The gaze vector ($G_3$) is determined in vehicle coordinates ($x_3$, $y_3$, $z_3$) based on the angle $\alpha_3$ and then converted into absolute coordinates based on the location and bearing ($L_3$, $B_3$, $t_3$) using a coordinate system transformation.

As the vehicle 10b moves forward from the first position C to a second position D on the road, the location ($L_4$) of the vehicle 10b is provided in absolute coordinates at a second time $t_4$. The orientation or bearing ($B_4$) of the second vehicle 10b can be provided in absolute coordinates and can include the azimuth angle and the elevation. The gaze direction of the driver can be provided in vehicle coordinates and can include the angle $\alpha_4$. The second gaze vector ($G_4$) for the second vehicle 10b is determined in vehicle coordinates ($x_4$, $y_4$, $z_4$) based on the angle $\alpha_4$ and then converted into absolute coordinates based on the location and bearing ($L_4$, $B_4$, $t_4$) using a coordinate system transformation.

The gaze vectors ($G_1$ and $G_2$) are calculated are stored in the gaze vector datastore 36 of the first vehicle 10a; and the gaze vectors ($G_3$ and $G_4$) are calculated and stored in the gaze vector datastore 36 of the second vehicle 10b. In some cases, the gaze vectors ($G_3$ and $G_4$) may be communicated to the first vehicle 10a and stored in the gaze vector datastore 36 of the first vehicle 10a. Likewise, the gaze vectors ($G_1$ and $G_2$) may be communicated to the second vehicle 10b and stored in the gaze vector datastore 36 of the second vehicle 10b.

With reference back to FIG. 2 and with continued reference to FIG. 1, the attention determination module 32 receives as input, gaze vectors 48 that were stored in the gaze vector datastore 36. The gaze vectors 48 may be gaze vectors 48 from a single vehicle (e.g., vehicle 10a of FIG. 2) or from multiple vehicles (e.g., vehicle 10a and 10b of FIG. 2). Based on the gaze vectors 48, the attention determination module 32 determines a point of interest 47 for a particular time 49 in the absolute coordinate system. For example, the attention determination module 32 evaluates a number of gaze vectors 48 over a certain time period, and if a threshold number of gaze vectors 48 in the time period intersect, then it is determined that, for that time period, the point of interest is at or near the intersection of the gaze vectors 48. The attention determination module 32 then sets the point of interest 47 to the coordinates of the intersection at the particular time 49.

In various embodiments, if a certainty of the point of interest 47 is low (e.g., only a minimal number of gaze vectors 48 intersect, or the point of interest is far from the vehicle, etc.), then the attention determination module 32 may rely on data from additional sources to confirm the point of interest 47. For example, statistical data received from the global attention processing system 16, or data from other systems of the vehicle 10 may be used in confirming the point of interest 47.

If a point of interest 47 is determined, the attention determination module 32 then selectively retrieves object data 50 from the object maps datastore 28. For example, the attention determination module 32 may evaluate the maps of the object maps datastore 28 for an object that is located at the point of interest 47. If the map indicates that an object is located at the point of interest 47, the attention determination module 32 defines an object of interest 51 at the particular point of interest using descriptive information about the object from the object maps datastore 28. The attention determination module 32 then stores the point of interest 47, the time 49, and the object of interest 51 as attention data 52 in the attention data datastore 38 for future use. If, however, the map does not indicate that an object is located at the point of interest 47, the attention determination module 32 may update the map with the point of interest 47 and information about the point of interest 47 that is received from other sources (e.g., from vehicle systems such as a vehicle camera or other system, or from systems remote to the vehicle), if available.

The attention data communication module 39 retrieves the attention data 52 from the attention data datastore 38 and prepares the attention data 52 for communication by the wireless communication system 20 to the global attention processing system 16. For example, the attention data communication module 39 packages the attention data 52 for a time period with an occupant identifier 57 (e.g., if multiple occupants can be tracked), a vehicle identifier 53 (e.g., the VIN or other data identifying the vehicle and/or the vehicle type), and, optionally, contextual data 55 (e.g., data defining the conditions during which the attention data was determined such as, but not limited to, weather conditions, road conditions, vehicle conditions, etc.) and communicates the packaged data 54 to the wireless communication system 20 for communication to the global attention processing system 16.

The attention director module 34 receives as input, vehicle location data 56 (e.g. from the global positioning system 22), and the attention data 52. Based on the inputs 52, 56, the attention director module 34 determines whether the driver's attention is directed towards a desired object. In various embodiments, the desired object may be defined in a map of desired objects and stored in the maps datastore 38. For example, based on the vehicle location data 56, the attention director module 34 selectively retrieves object data 58 (i.e. data of desired objects defined to be within a proximity to the vehicle location) from the maps of the object maps datastore 28. In various embodiments, the desired object may be determined by a system of the vehicle 10. For example, the desired object may be received from a navigation system, or other system of the vehicle (data flow not shown).

The attention director module 34 then compares the point of interest 47 from the attention data 52 with the location of the desired object from the object data 58. If the point of interest 47 and the location of the desired object are relatively the same, the attention director module 34 determines that the driver's attention is towards the desired object and no notification data 60 is sent. If, however, the point of interest 47 is different than the location of the desired object, the attention director module 34 determines that the driver's attention is not towards the desired object (rather it may be towards another object on the map or not towards any object at all) and the attention director module 34 sends notification data 60 to the attention director system 14 to direct the driver's attention.

Figure 4:
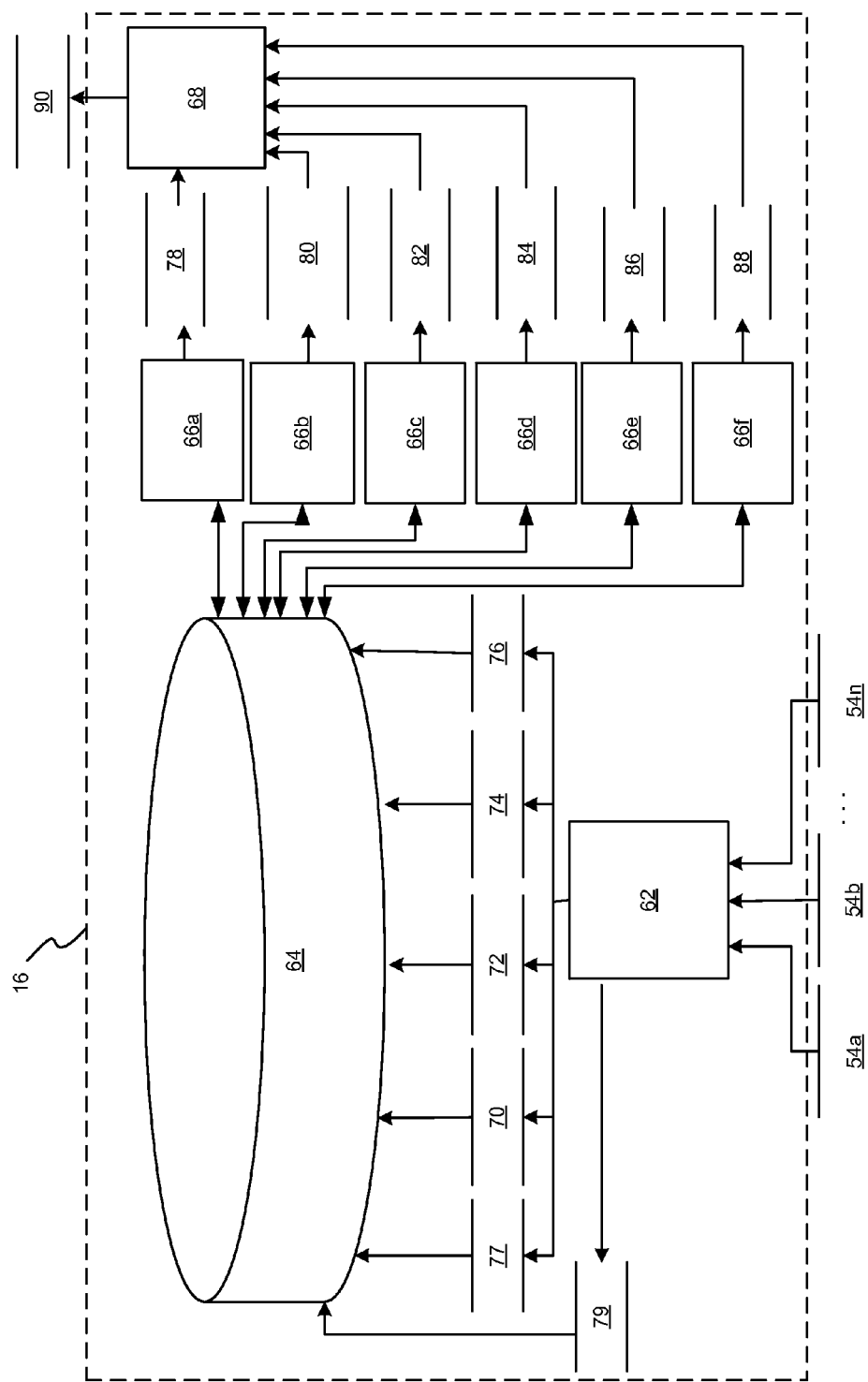
FIG. 4 is a functional block diagram illustrating functional modules of the global attention processing system in accordance with various embodiments.

Referring now to FIG. 4 and with continued reference to FIG. 1, a functional block diagram illustrates various embodiments of the global attention processing system 16 of FIG. 1. Various embodiments of a global attention processing system 16 according to the present disclosure may include any number of sub-modules. As can be appreciated, the sub-modules shown in FIG. 4 may be combined and/or further partitioned to similarly receive and process the driver attention data 54 of FIG. 2. In various embodiments, the global attention processing system 16 includes a data storage module 62, a global attention data datastore 64, one or more data processing modules 66a-66n, and an output generation module 68.

The data storage module 62 receives as input the driver attention data 54a-54n from various vehicles 10a, 10b, etc. and selectively stores the driver attention data 54a-54n in the global attention data datastore 64. For example, the data storage module selectively categories and stores the data based on vehicle data 70, time data 72, point of interest data 74, object of interest data 76, the various contextual data 77, and/or occupant data.

The data processing modules 66a-66n selectively retrieve the stored data from the driver attention data datastore 64 and process the data using one or more data processing methods to produce various statistics. For example, a first data processing module 66a processes the data to determine global points of interest 78, that is, points of interest that are identified by a number of times by a particular driver, by a number of occupants of a vehicle, and/or by a number of vehicles. In another example, a second data processing module 66b processes the data to determine global objects of interest 80, that is, objects of interest that are identified by a number of times by a particular driver, by a number of occupants of a vehicle, and/or by a number of vehicles. In still another example, a third data processing module 66c processes the data for frequencies 82 that particular points or objects are identified as a point or an object of interest (i.e., the frequency that the object actually attracts a driver's attention when driving by). In still other examples, a data processing module 66d processes the data to identify similarities 84 between the drivers attention and the attention of other drivers (e.g., using collaborative filtering methods). In still other examples, a data processing module 66e processes the data to identify contextual conditions 86 (e.g., weather, road conditions, traffic, seasons, etc.) that determine particular points or objects that are more prone to attention. In still other examples, a data processing module processes 66f the data to identify attention spatter 88 (i.e., how often the driver changes his focus of attention) and contextual data surrounding attention spatter such as time of day, weather conditions, etc.

The output generation module 68 receives the processed data 78-82 from the data processing modules 66a-66n. The output generation module 68 generates one or more reports 90 based on the processed data. For example, the output generation module 68 generates a graphical report, such as map that includes identifiers (e.g., hot spots, or other identifier) of the global points of interest 78, or global objects of interest 80. In another example, the output generation module 68 generates a textual and/or data report that includes the frequencies 82 and/or other statistics 84-88.

In various embodiments, the data report may be communicated back to the vehicle 10 and the vehicle 10 may use the data from the data report (e.g., as probabilities or weights) to determine future points of interest and/or objects of interest. In various embodiments, the statistics can be further processed with other data (e.g., other data received from the vehicle, or other entities) to generate reports of probabilities of pursuing other actions that relate to attention given to a particular object. Such actions may include, but are not limited to, purchasing items seen in advertisements, driving to a particular destination, other events. In various embodiments, the statistics can be processed with other data to generate reports of road conditions having a potential to distract drivers causing the drivers to lose focus. These reports may be communicated to business entities such as road authorities and/or can be communicated back to the vehicle 10 for enhanced vehicle control during the road condition.

Figure 5:
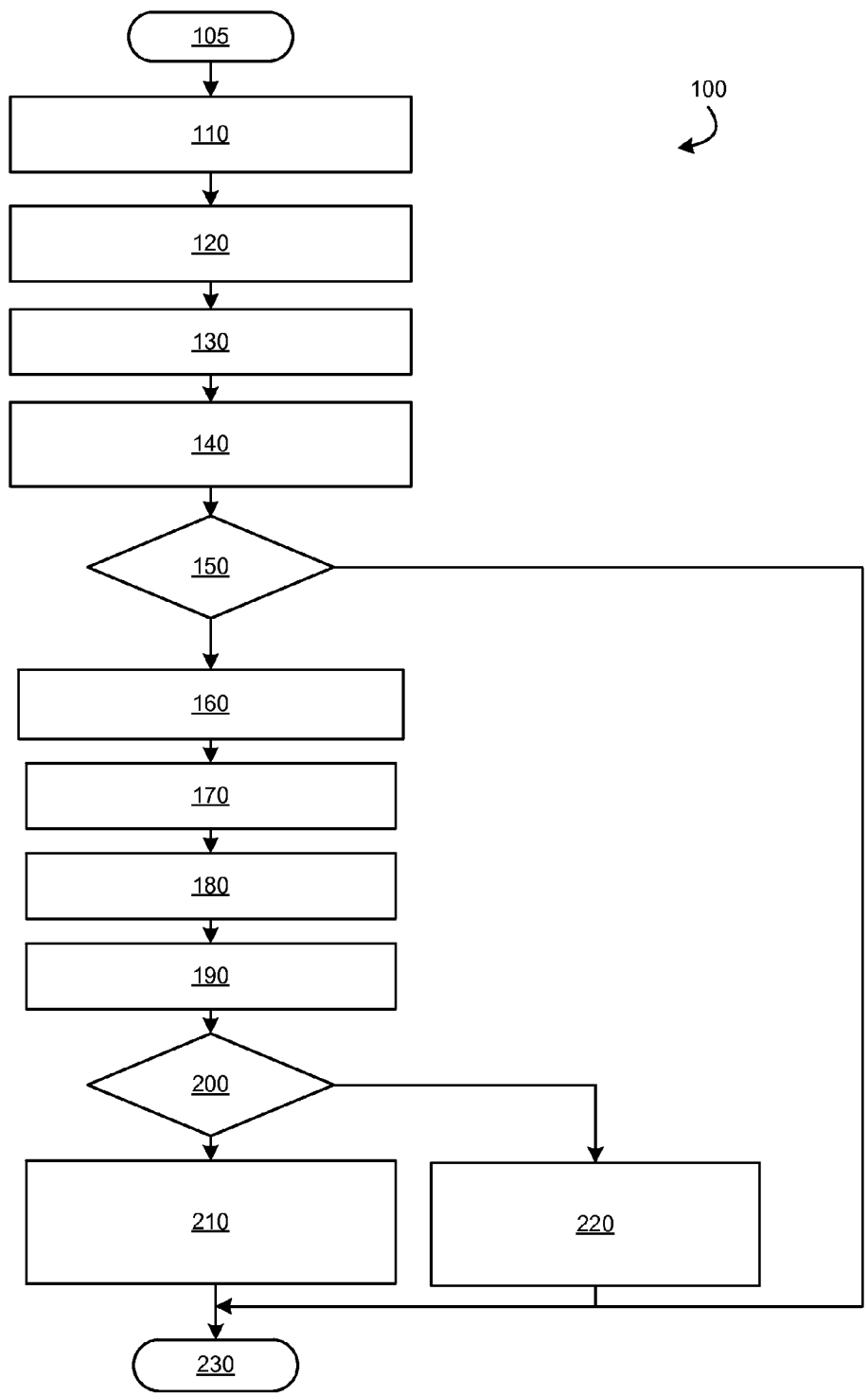
FIG. 5 is a flowchart illustrating a driver attention detection method that may be performed by the driver attention detection system in accordance with various embodiments.
Figure 6:
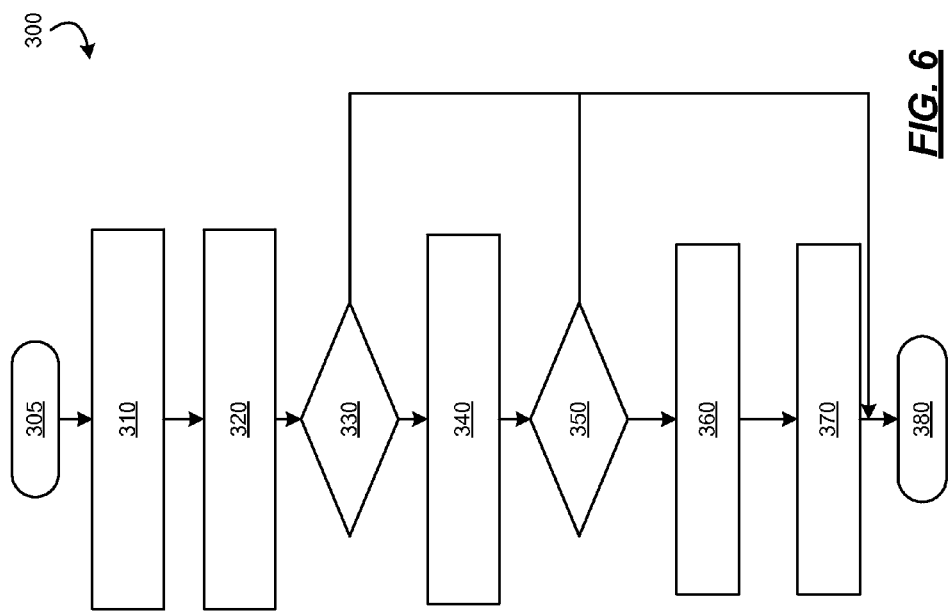
FIG. 6 is a flowchart illustrating a driver attention direction method that may be performed by the driver attention detection system in accordance with various embodiments.

Referring now to FIGS. 5-6 and with continued reference to FIGS. 1-4, flowcharts illustrate attention determination methods and attention director methods that may be performed by the sub-modules of the attention determination module 18 in accordance with various embodiments. As can be appreciated in light of the disclosure, the order of operation within the methods is not limited to the sequential execution as illustrated in FIGS. 5-6, but may be performed in one or more varying orders as applicable and in accordance with the present disclosure. As can further be appreciated, one or more steps of the methods may be added or removed without altering the spirit of the method.

With particular reference to FIG. 5, a flowchart illustrates exemplary sequences of steps of a method 100 for determining driver attention in accordance with exemplary embodiments. The method may begin at 105. The vehicle location data 40 that indicates the vehicle location in absolute coordinates is received at 110. The vehicle orientation data 44 that indicates the vehicle orientation in absolute coordinates is received at 120. The gaze direction data 42 that indicates the gaze direction in vehicle coordinates is received at 130. Based on the vehicle location, the vehicle orientation, and the gaze direction, the gaze vector 46 is calculated in absolute coordinates (e.g., as discussed above, or according to other methods) and stored at 140.

If, at 150, enable conditions are not met for processing the gaze vectors (e.g., a certain number of gaze vectors have not been stored for a certain time period, or other enable condition), the method may end at 230. If, however, enable conditions are met for processing the gaze vectors at 150, gaze vectors 48 are processed at 160-220.

For example, the gaze vectors 48 associated with a time period are retrieved from the gaze vector datastore 36 at 160. It is determined whether x or more gaze vectors for the time period intersect at 170. If x or more gaze vectors for the time period do not intersect at 170, the method may end at 230. If, however, x or more gaze vectors for the time period intersect at 170, the point of interest is set to the point of intersection at 180. The map for the point of interest is retrieved from the object maps datastore 28 at 190. If an object of interest is determined from the map at 200, the attention data 52 is generated including the occupant identifier (if multiple occupants), vehicle identification data, the point of interest data, the time data, and the object of interest data, and stored at 210. Thereafter, the method ends at 230. If, however, an object of interest is not determined from the map at 200, the attention data 52 is generated including the occupant identifier (if multiple occupants), vehicle identification data, the point of interest data, and the time data and stored at 220. Thereafter, the method ends at 230.

With particular reference to FIG. 6, a flowchart illustrates exemplary sequences of steps of a method 300 for directing a driver's attention in accordance with exemplary embodiments. As can be appreciated, the method can be used in any number of scenarios to direct the driver's attention. For example, the method may be used in a navigation system to direct the driver's attention to a road sign, a next turn, or an exit ramp. In another example, the method may be used by an advertisement system to direct the driver's attention to a particular upcoming billboard advertisement.

The method may begin at 305. The vehicle location data 56 that indicates a current location of the vehicle 10 is received at 310. The object data 58 is retrieved from the object maps datastore 28 at 320. It is determined whether a desired object of interest is located at or near the location of the vehicle 10 at 330. The desirability of the object of interest may depend on the type of system performing the method. For example, if the navigation system were performing the method, the desired object of interest may be a next exit in the navigation route.

If the desired object of interest is not located at or near the location of the vehicle 10 at 330, the method may end at 380. If, however, the desired object of interest is located at or near the location of the vehicle 10 at 330, the notification data 60 is selectively generated at 340-370. For example, the attention data 52 is received at 340, and it is determined whether the attention data 52 indicates that the point of interest of the driver at that time is at or near the location of the desired object of interest at 350. If the point of interest is at or near the location of the desired object of interest at 350, no direction notification data 60 is generated and the method may end (e.g., it is determined that the driver's attention is already on the desired object of interest) at 380. If, however, the point of interest is not at or near the location of the desired object of interest at 350, the direction notification data 60 is generated at 360 and the driver is notified via the attention director system 14 at 370. Thereafter, the method may end at 380.

Figure 7:
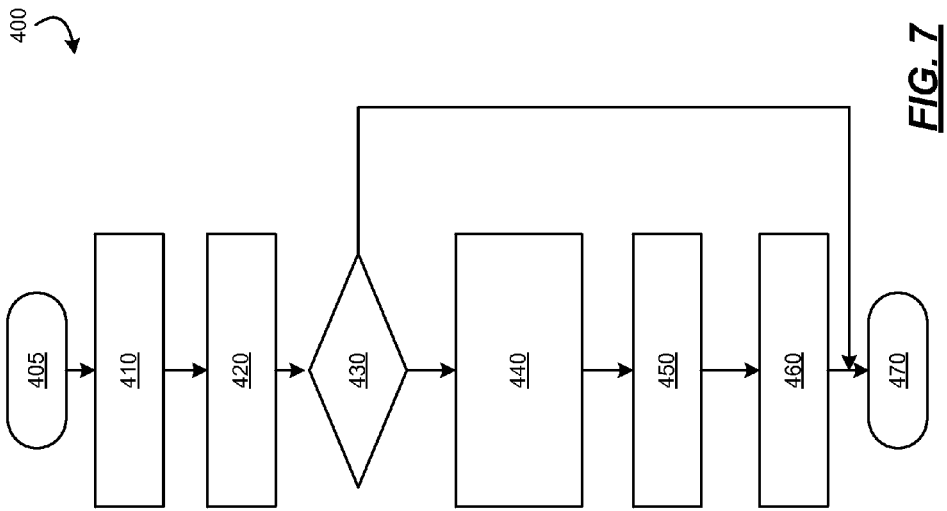
FIG. 7 is a flowchart illustrating a global attention processing method that may be performed by the global attention processing system of FIG. 1 in accordance with various embodiments.

With reference to FIG. 7 and with continued reference to FIGS. 1-4, a flowchart illustrates exemplary sequences of steps of a method 400 for processing attention data 54a-54n and that may be performed by the global attention processing system 16 in accordance with exemplary embodiments. The method may begin at 405. The attention data 54a for a particular vehicle 10a is received at 410. The attention data 54a is selectively stored in the global attention data datastore 64 based on the vehicle identifier 70, the point of interest 74, the time 72, and/or the object of interest 76 at 420.

It is determined whether enable conditions are met for processing the attention data of the global attention data datastore 64 at 430. If enable conditions are not met at 430, the method may end at 470. If, however, the enable conditions are met at 430, the stored attention data is processed using one or more processing methods (e.g., frequency processing, global objects of interest processing, global points of interest processing, etc.) at 440, and a report of the results is generated in a graphical format, a textual format, and/or a data format at 450. The report is then communicated to a vehicle, or other entity for use depending on the type of processing performed at 460. Thereafter, the method may end at 470.

As can be appreciated, the disclosed methods and systems may vary from those depicted in the Figures and described herein. For example, as mentioned above, the vehicle 10 of FIG. 1, and the modules of FIGS. 2 and 4, and/or portions and/or components thereof may vary, and/or may be disposed in whole or in part in any one or more of a number of different vehicle units, devices, and/or systems, in certain embodiments. In addition, it will be appreciated that certain steps of the methods 100, 300, and 400 may vary from those depicted in FIGS. 5-7 and/or described above in connection therewith. It will similarly be appreciated that certain steps of the methods 100, 300, and 400 may occur simultaneously or in a different order than that depicted in FIGS. 5-7 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting an attention of an occupant of a vehicle, comprising:
   calculating, by a processor, a first gaze vector in a three-dimensional space based on a first vehicle location, a first vehicle orientation, and a first gaze direction;
   calculating, by the processor, a second gaze vector in the three-dimensional space based on a second vehicle location, a second vehicle orientation, and a second gaze direction; and
   determining the attention of the occupant based on the first gaze vector and the second gaze vector.

2. The method of claim 1 wherein the three-dimensional space is outside of the vehicle.

3. The method of claim 1, further comprising:
   determining a point of interest based on the first gaze vector and the second gaze vector, and
   wherein the determining the attention of the occupant is based on the point of interest.

4. The method of claim 3, further comprising:
   determining an intersection point of the first gaze vector and the second gaze vector, and
   wherein the determining the point of interest is based on the intersection point.

5. The method of claim 3, further comprising:
   retrieving object data from a datastore based on the point of interest;
   defining an object of interest based on the object data; and
   wherein the determining the attention of the occupant is based on the object of interest.

6. The method of claim 2, further comprising:
   comparing the point of interest to a location of a desired object; and
   generating notification data to direct the occupant's attention to the desired object when the point of interest is not the same as the location of the desired object.

7. The method of claim 6, wherein the desired object is received from a vehicle system.

8. The method of claim 7, wherein the vehicle system is a navigation system.

9. The method of claim 6, wherein the desired object is based on a map of desired objects that is communicated to the vehicle.

10. The method of claim 6, wherein the notification data activates at least one of an audio device, a display screen, a haptic device, a heads-up display, a light, and a phone.

11. The method of claim 1, further comprising:
communicating information about the attention of the occupant to a global attention processing system.

12. The method of claim 11, wherein the information comprises, at least one of a vehicle identifier and an occupant identifier.

13. The method of claim 11, wherein the information comprises contextual data associated with the attention of the driver.

14. The method of claim 11, wherein the information comprises at least one of a point of interest and an object of interest.

15. The method of claim 1, wherein the first vehicle location and the first vehicle orientation are according to an absolute coordinate system,
wherein the first gaze direction is according to a vehicle coordinate system,
wherein the calculating is based on a coordinate transformation method that transforms from the vehicle coordinate system to the absolute coordinate system,
wherein the second vehicle location and the second vehicle orientation are according to the absolute coordinate system,
wherein the second gaze direction is according to the vehicle coordinate system, and
wherein the calculating is based on the coordinate transformation method that transforms from the vehicle coordinate system to the absolute coordinate system.

16. The method of claim 15, further comprising:
determining an intersection point of the first gaze vector and the second gaze vector, and
wherein the determining the point of interest is based on the intersection point.

17. A system for detecting an attention of an occupant of a vehicle, comprising:
a first module that calculates a first gaze vector in a three-dimensional space based on a first vehicle location, a first vehicle orientation, and a first gaze direction, and that calculates a second gaze vector in the three-dimensional space based on a second vehicle location, a second vehicle orientation, and a second gaze direction; and
a second module that determines the attention of the occupant based on the first gaze vector and the second gaze vector.

18. The system of claim 17, wherein the second module determines the attention of the occupant based on an intersection point of the first gaze vector and the second gaze vector.

19. The system of claim 18, further comprising:
a third module that retrieves object data from a datastore based on the point of interest, and that defines an object of interest based on the object data, and
wherein the second module determines the attention of the occupant based on the object of interest.

20. The system of claim 17, further comprising:
a fourth module that compares the point of interest to a location of a desired object, and that generates notification data to direct the occupant's attention to the desired object when the point of interest is not the same as the location of the desired object.

\* \* \* \* \*